INVENTOR.
JOHN J. HORAN

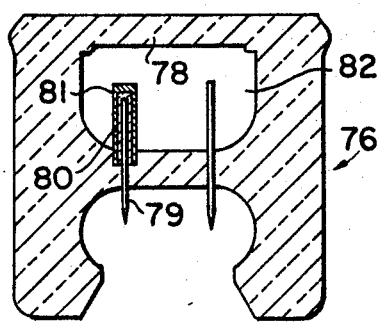
Fig. 9
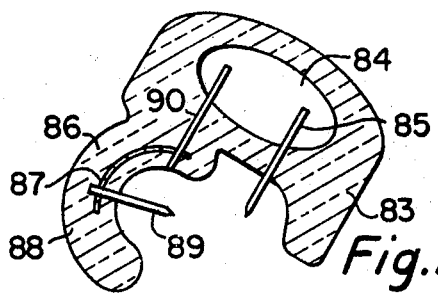
Fig. 10
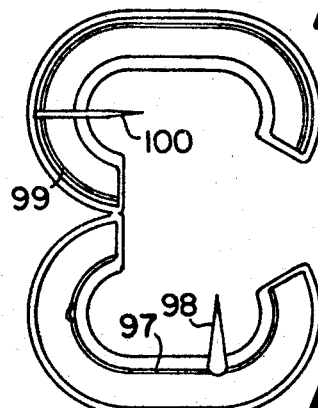
Fig. 12
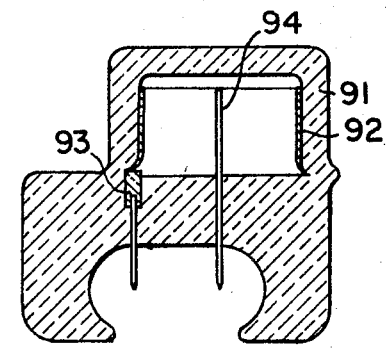
Fig. 11
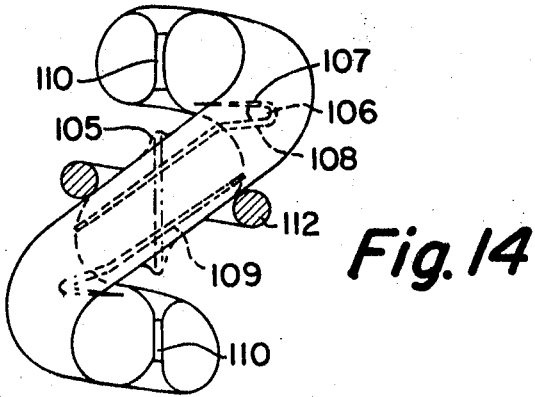
Fig. 13
Fig. 14
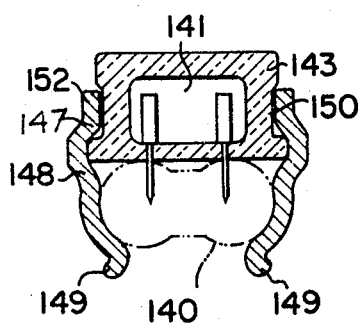
Fig. 22
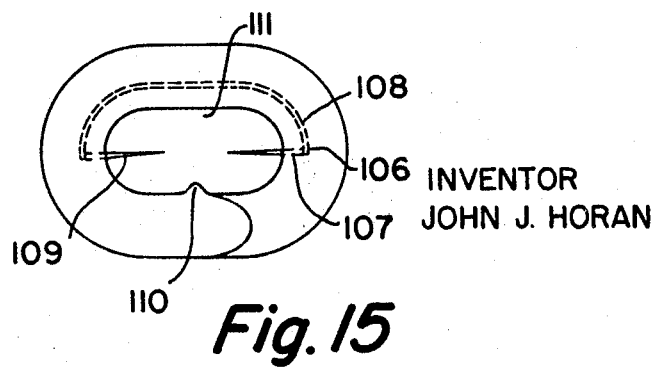
Fig. 15
INVENTOR
JOHN J. HORAN

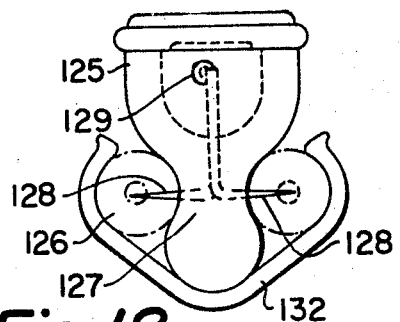
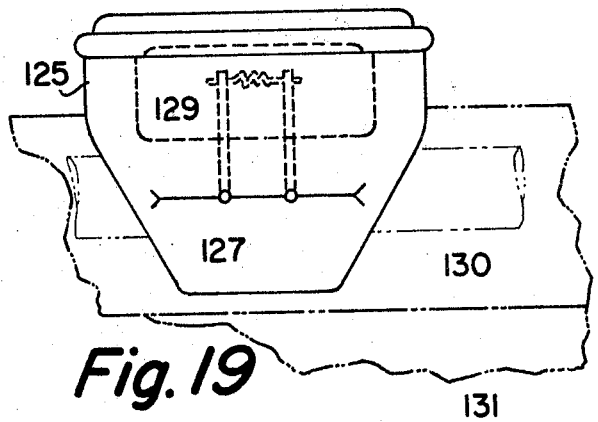
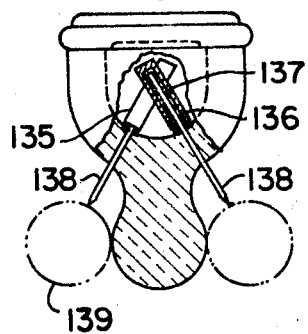
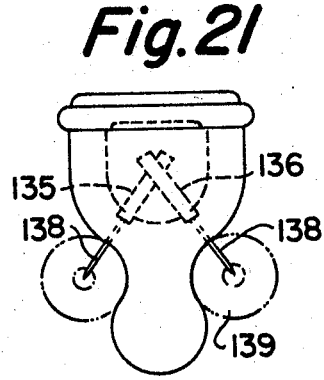
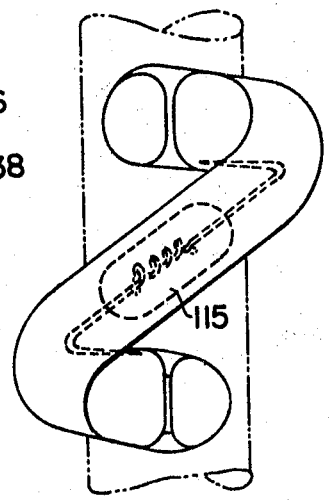
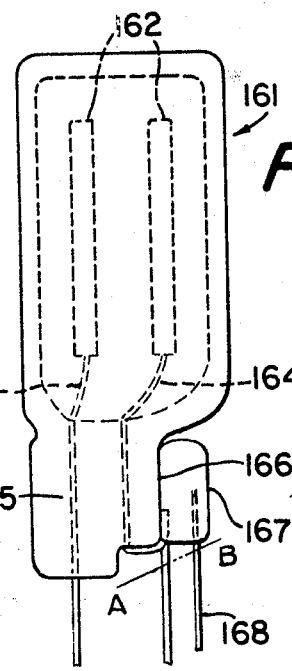
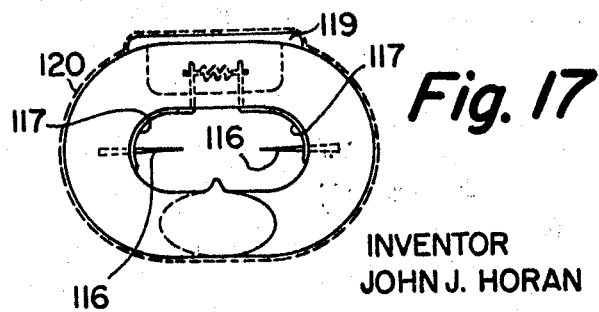
INVENTOR
JOHN J. HORAN

INVENTOR
JOHN J. HORAN

United States Patent Office 3,445,720
Patented May 20, 1969

3,445,720
MONOLITHIC ELECTRIC LAMPS, MOUNTABLE
ON CORDS AND ELSEWHERE
John J. Horan, 420 Quigley Ave.,
Willow Grove, Pa. 19090
Filed May 31, 1967, Ser. No. 642,498
Int. Cl. H01j 7/44, 17/34, 19/78, 23/16, 29/96;
H01k 1/62
U.S. Cl. 315—58                                    35 Claims

ABSTRACT OF THE DISCLOSURE

This invention relates to self-sufficient, miniature, monolithic, electric lamps, including a few filament types, the remainder being gas-discharge lamps having no runaway characteristics. Being self-sufficient, they may be connected directly across 115-volt lines. Most of the lamps have sharp lead prongs capable of piercing elastomeric electric-lamp cords. These are of such overall shapes that they can be readily locked upon such chords without the use of tools or accessories.

FIELD OF THE INVENTION

This invention relates generally to self-sufficient, miniature, monolithic, electric lamps, including both filament types and non-runaway gas-discharge (neon, etc.) types, and particularly to configurations of such lamps that are suitable for mounting directly upon and coacting directly with ordinary electric lamp and appliance cords, particularly those cords having elastomeric insulating coatings. Because most such lamp cords are of small size, most of the disclosed lamps will usually be made very small; however, the unique configurations lend themselves to increases in size, as long as the larger versions remain compatible with available means for supporting them.

It is desirable to have "on" indicators for certain appliances, such as soldering irons, etc., which consume considerable current, constitute potential fire hazards, and present safety hazards to those who may be unaware that certain electrical apparatus may be energized. A tiny electric lamp, mounted upon the appliance cord, would serve as an excellent "on" indicator if it could be simply held in place. Other lights of similar character could be placed upon lamp cords so that they and the lamps they feed may be easily located in the dark. Where an in-line switch is located upon an appliance cord feeding an electric blanket, for example, a pair of such indicators, one above and one below the switch, would be desirable.

Small, rugged, simple, self-sufficient glow lamps of the type disclosed have other applications as well; and they prevent the possibility of failures and other difficulties caused by use of incorrect values of series resistance.

Ornamental and novelty systems of lights mounted upon electrical supply cords, such as those used on Christmas trees, now require a multiplicity of sockets, one for each lamp. These small sockets, besides adding to the cost, often are erratic in performance and sometimes constitute fire hazards.

I have determined that a straightforward direct lamp connection with a twin-conductor lamp cord can be achieved, with no need for separate attachment devices, clamps, sockets, adapters, plugs, etc, as well as resistors, terminals, and apparatus for mounting and housing such ancillaries, and with no cutting of cords, by means of a certain related family of design for lamps that I have invented for direct connection with cords and other circuit elements. Most of the lamps of this family have no relatively moving, movable, or detachable parts, no linkages, etc.; and those applicable to appliance cords consist of a single, monolithic, vitreous assembly that makes effective use of the inherent compliance of certain electrical insulations to effect permanent, but readily detachable, installation thereupon at any desired point, with no tools or accessories or auxiliary components whatsoever.

DESCRIPTION OF THE PRIOR ART

There exist in the prior art a number of devices adapted to be secured to electric-lamp cords, including plugs, taps, and lamp sockets. A number of these devices include metallic means for making electrical connections to such cords by stabbing them through the insulation, as is done in this case. One neon indicator is encapsulated in plastic and is squeeze-inserted into a tight-fitting hole in a tool handle. This device has prongs for making connection to conductors within. In FIG. 2 of Patent No. 3,020,437, issued to the undersigned, the lamp has a sharp terminal on the end of a spring that is intended for stabbing a battery terminal; but it is unsuited for the present purpose. No lamps are known that emplace themselves directly upon cords without ancillary parts or tools.

There are a great many designs of lamps which, insofar as the gas-discharge and filament-type energy sources therein contained are concerned, are comparable to some of the present lamps. It is characteristic of the prior art, however, to interpose intermediary devices and apparatus to position and hold the lamps and to provide both devious paths for guiding electric energy to terminals on the lamp and miscellaneous series resistance means external to the lamp but in its supply circuit to prevent catastrophic runaway of glow-discharge lamps. Often a grievous burden of ancillary apparatus, which needs to be assembled thereto with tools, is borne by the cord or by independently supported means. Such apparatus almost invariably imposes additional costs exceeding the cost of the lamp by several multiples.

Indicator lamps, such as are included herein, particularly gas-filled ones employing neon, are widely used. Nearly everywhere they are found, however, they are associated with coacting holding, positioning, and electrical-connection and governing means having a bulk volume and a combined cost far greater than that of the lamp itself.

Gas-discharge lamps usually require a series resistor or other current limiter because of their runaway characteristics. Those used on 115-volt circuits normally are furnished with a series resistor, often positioned and mounted remotely from the lamp. Those glow lamps having screw bases for use in standard Edison sockets necessarily have wire-in series resistors packed within these crew bases. Neon lamps having wire pigtails often have the resistor wired in series onto one of the pigtails.

SUMMARY OF THE INVENTION

The lamps of this application provide both support means for themselves and the proper kind of electrical continuity also; but they are burdened with neither the ancillaries of the prior art nor the customary requirement for installation tools.

Most of these lamps are monolithic vitreous structures, for the most part without dangling, hinged, or separate means for aiding attachment or wiring them into a circuit. When so desired, they conform non-critically to the ordinary shape of a two-conductor lamp cord to a degree sufficient that the compliance of the lamp cord provides the supplementary holding power, whereby these rigid moldings may be snapped onto and be gripped in place thereafter by the elasticity of the insulation of the cord itself. The leads that constitute part of or support the radiant energy sources in the lamp are extremely short and direct in character; and those intended for on-cord installation terminate in sharp points that pierce the elastomeric insulation through to the electrical conductors within the cord and thus augment the holding power exerted between the elastomer and the vitreous structure of the lamp. Where necessary to provide a high resistance between the lamp cord and the radiant energy device, as in gas-discharge types, a resistive means is built into the lamp itself, or applied to a surface.

The resistor is usually incorporated within the monolithic envelope or fused or otherwise bonded and supported thereon. The resistor may constitute merely a small portion of the glass or other vitreous material, which has been suitably doped with material of low conductivity, or which has been penetrated by a fused-in track of such materials. One such known high-resistivity substance is tin oxide ($SnO_2$); and this may be mixed with other oxides to modify its conductive properties for specific applications. Tin oxide coatings are customarily applied upon the outer surfaces of cylindrical resistors, which thereafter usually receive further coats or sleeves of insulating materials. The introduction of carbon and/or metal particles to ceramics and vitreous materials in order to provide paths of low conductivity is also known. The manner of introduction here and the self-incorporated functions taught herein are new however.

It will be understood that the term "vitreous" as used herein refers generally to fused compositions of oxides, usually containing silicia, and that the term may include component or isolated amounts of what are often considered to be "ceramics," particularly when such materials are fused or otherwise bonded to the structure or housed therein.

OBJECTS AND BRIEF DESCRIPTION OF DRAWINGS

The implicit and explicit objects of the invention disclosed in the discussion above are supplemented in the claims, in the descriptions of the embodiments, and in the drawings in which:

FIGS. 1, 2, and 3 are, respectively, an elevation cross section, a plan, and an underside view, all enlarged in scale, of a gas-discharge lamp of this invention capable of direct push-on installation upon a two conductor lamp or appliance cord;

FIGS. 4 and 5 are each sectional elevations of similarly installed lamps varying in external configurations, each of these lamps including a filament, and FIG. 6 is a view of the lamp of FIG. 5 from below;

FIGS. 7, 8, 9, 10, and 11 are each sections in elevation of five alternative configurations of gas-discharge lamps intended to be installed upon appliance cords;

FIGS. 12 and 13 are unassembled half-section views of another alternative lamp in accordance with this invention;

FIGS. 14 and 15 are, respectively, a plan view of a gas-discharge lamp of helical configuration adapted for twist-on installation, and an elevation view of the same lamp;

FIGS. 16 and 17 are, respectively, plan and elevation views of a second helical twist-on lamp, this time having a filament-type energy source;

FIGS. 18 and 19 are, respectively, an installed end view of a filament lamp which requires that the insulating material of the cord be split axially prior to its installation, complete with an ancillary clip, and a side view of the lamp;

FIGS. 20 and 21 are, respectively, views prior to and during the installation of a gas-discharge lamp having a structure like that of the prior lamp but with a different electrode-lead structure;

FIG. 22 is an illustration of a gas-discharge lamp of composite construction in accordance with this invention;

FIGS. 23, 24 and 25 are single views of gas-discharge lamps in accordance with this invention.

DESCRIPTION OF THE PREFERRED EMBODIMENTS

Figure 2:
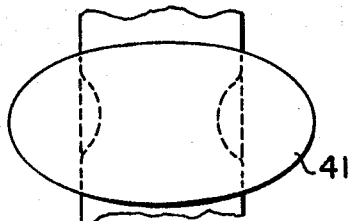
Figure 1:
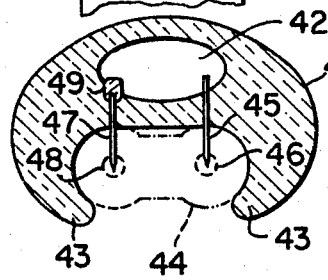
Figure 3:
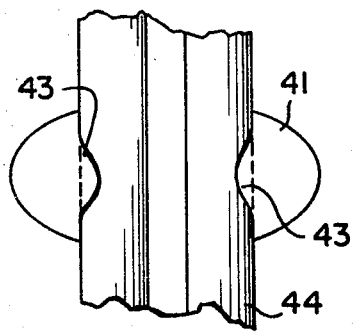

Referring now to FIGS. 1, 2, and 3, the lamp comprises a monolithic vitreous sealed enclosure structure 41, preferably of fused or molded glass composition, having a radiant-energy generating cavity or chamber 42 and two legs 43 depending therebelow on opposite sides thereof, with inwardly facing termini. The legs 43 are of sufficient strength and stiffness to deform the edges of the resilient appliance cord 44, shown in phantom, while being forcefully engaged therewith by directly applied finger pressure. Sharp pointed pin electrode 45 of the lamp pierces the right half of the cord 44 to make electrical contact with conductor 46 therewithin. The pointed-pin portion 47 of the other electrode does likewise to conductor 48. The upper portion 49 of the second electrode is an integrally fused composition which is preferably of a glass matrix doped with a sufficient amount of conductive material to provide a high-resistance path between pin portion 47 and the gas-filled cavity 42. Resistance values permitting only very low current flows, often well below one milliampere, are most appropriate. The range for this particular embodiment will usually lie between 30,000 ohms and one quarter megohm. Some gas discharge lamps seen hereinafter will function well with lower values of resistance incorporated. These values refer to 115-volt circuits.

Permissible currents are a direct function of electrode area, chamber volume, the type of gas, and other related variables. Various types of current-leakage materials, such as are used in the low-wattage fixed resistors consumed in large quantities by the electronics industry, may be used in the resistive portion 49 of the lead. Preferably, however, precautions will be taken to minimize or prevent admission into the glow-discharge chamber, via the resistive material, of emitted or transmitted gaseous adulterants which undesirably affect the glow characteristics, starting voltage, etc. Preferably, the resistor is simply a tiny localized region in the insulating glass of the envelope into which a small amount of electrically conductive contaminant has been introduced.

The top of resistive portion 49 of the second electrode projects into energy chamber 42, which preferably contains a low-pressure charge of a gas that ionizes at such pressure when a voltage well below 115 volts is applied.

When the lamp of FIGS. 1 to 3 is made in two halves that are fused generally at the midplane of FIG. 1, the resistor portion 49 will generally be produced by the prior staining, etching, printing, reducing, or other suitable processing of the mating surface of one of the two halves at 49 so as to create a slightly conductive track in the dielectric glass medium. The conductive contaminant can come from the surface of the electrode or pin portion itself, particularly if the assembly process involves installing the pin 47 by piercing it downwardly into the lower glass portion via the energy chamber.

In FIG. 1 and elsewhere in the drawings, the resistors are portrayed as of relatively small size, even as compared with the tiny lamps themselves. Techniques are possible for further reducing their size. If we assume the resistor portion 49 to be a contaminated zone resembling a flat film in character where it lies between two halves or an annular film created by the passage of a lead through glass, it is well known that a square area of uniform film of a given thickness will have the same value of resistance between its opposite sides no matter how large or small the area of the square is made or cut. For a given film material, the thickness and length/width ratios are, of course, controllable variables. Many materials are available today that will yield high resistance values in small volumes without deterioration if the current level is kept low. Treatments of glass to make it slightly conductive in localized areas can be derived from the many treatments applied to large areas in applications unrelated to gas-discharge lamps. Among the possible treatments are reduction, with certain applied oxides, with carbon, by suspending metal particles in the glass matrix, by sputtering, vapor deposition, diffusion into a matrix from the surface, etc. Processes now in use in the manufacture of thin-film circuits and integrated circuits may also be applied to the glass body of a gas-discharge lamp.

On the other hand, there is no vital reason why the resistor portions or zones cannot be enlarged to represent a much greater portion of the total vitreous structure of the lamp. While it is quite possible to build the entire lamp of FIG. 1 out of a conductive glass, except for an insulating sheath immediately surrounding pin electrode 45, it would not be safe to do so because the lamp would be "live" to the touch. Lamps in accordance with this invention can, however, be fabricated generally of such conductive glass provided that insulating films, preferably also if glass, are well bonded to all external surfaces that remain exposed when the lamp is mounted upon an appliance cord.

Figure 4:
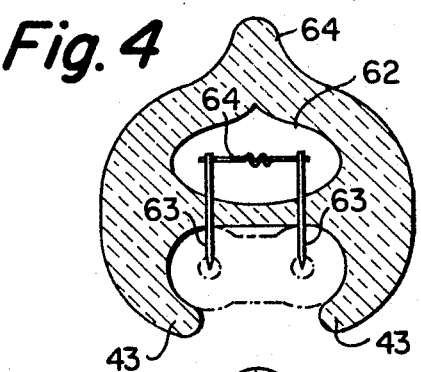

Referring now to FIG. 4, there is seen a second monolithic vitreous sealed device 61, having a cavity 62 and legs 43 like those described previously. Cavity 62 contains two sharp-pointed pins serving as leads 63 for filament 64 and passing outwardly through the lower surface of the glass. They are likewise capable of piercing lamp or appliance cords, as seen hereinbefore. Cavity 62 is evacuated or filled with a non-reactive gas and sealed by tipoff 64 if made in one piece or by heat bonding between the two halves if optionally bonded in the plane of the drawing.

Figure 5:
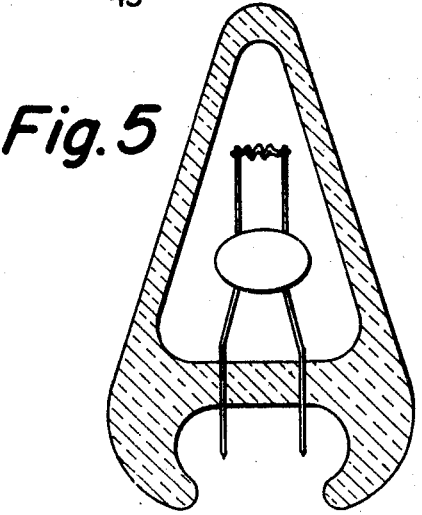
Figure 6:
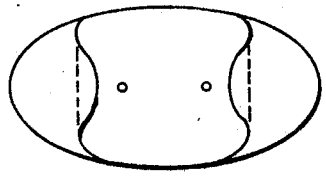

Referring now to FIGS. 5 and 6, this filament lamp, of an attractive conical configuration, is similar in structure to FIG. 4 and likewise can be produced by means of a variety of techniques well known in the art.

Figure 7:
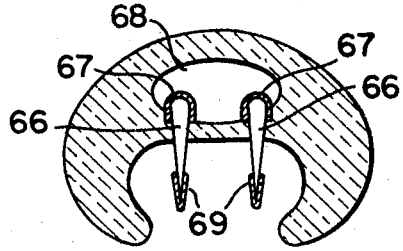

Referring now to FIG. 7, the lamp differs from FIGS. 1 to 3 mostly in the structure of the electrodes 66, which are principally of conductively doped vitreous construction and are of generally blunter taper than shown in the prior figures, as befits the more brittle nature of the material, than were the metallic lead-electrodes. Electrodes 66 are optionally tip-coated thinly with metal plating 67 in cavity 68 and may be coated also at their tips with metal plating 69. Only one of the electrodes needs to be of a resistive type, of course, but it will generally be easier to process the lamp if both electrodes have the same character. Resistance values per pin will then be halved. Instead of metallic coatings, the electrodes might alternatively have had tiny inserted needles. It is preferable, however, that the entire structure be vitreous so as to eliminate all sealing and expansion problems.

Figure 8:
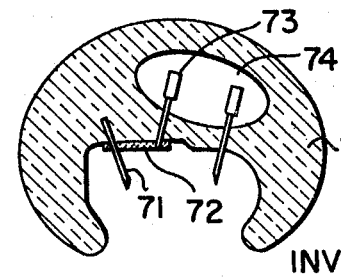

Referring now to FIG. 8, the lamp 70 has a composite electrode comprising a sharpened pin portion 71, a reistor portion 72, preferably fused, but permissibly otherwise bonded upon the undersurface, and an electrode portion projecting into cavity 74. Portion 72 may be a surface film, with or without insulative coating. Referring next to FIG. 9, the lamp 76 has its upper portion configured as a cylinder, with a fused flat-plate closure 78. The left-hand electrode array comprises a pin portion 79, an annular resistor portion 80, and a conductive annular surface 81, where the electrode projects into cavity 82. The resistor 80 may be merely a very thin, slightly conductive cement between pin portion 79 and an outer conductive layer or metallic tube; or the surface 81 may be instead a metallized coating over a conductive plastic, ceramic, or vitreous interlayer. The outer layer should have a relatively low resistance, as well as uniform spacing from the opposite electrode if good distribution of glow is desired.

Referring now to FIG. 10, this fused lamp assembly comprises two principal portions, one 83 at the right and above having one leg, a cavity 84, and electrode 85, resembling those seen in FIG. 1. The fused-on second portion 86 has resistor 87 and insulator 88, from which project pin 89 and electrode 90, the latter also entering cavity 84. The remote end of the second portion 86 also forms the second leg.

Referring now to FIG. 11, this lamp has a fused on upper portion 91, shaped like an inverted cup and lined with a thin, preferably invisible, conductive coating 92 that makes contact with the upper end of resistor 93 and forms a cylindrical electrode surrounding pin electrode 94.

Referring now to FIGS. 12 and 13, lamp 96 is shown prior to fused assembly of its opposite halves, open in both cases. The half section in FIG. 13 includes an electrode plating 97 along the inner surface of the inner edge and a conductive vitreous resistor-pin portion 98 making contact therewith. The other half, separately shown in FIG. 12, includes wire electrode 99 located along and near the inner surface of the outer edge and pin 100 spot-welded thereto. Plating 97 may be relieved as shown or other suitable steps may be taken to keep it from making contact with pin 100. Unlike prior plunge-on versions, the leg and pin configuration here suggests and functions best when installation is made in a roll-on manner. One edge of the appliance cord is first directly engaged with pin 100 and the cord is then rolled into engagement with resistor pin 98.

One method by which the helical lamp next seen in FIGS. 14 and 15 may be assembled is by joining two nearly identical halves end to end at midlength, producing the slight flash 105 shown by phantom lines. If the lamp is of the gas-discharge type, one or both halves will need a resistor, such as that at 106, fusibly interposed between pin 107 and electrode 108. A single electrode 109, bent to match the array 106, 107, 108 will suffice for the other half. Legs 110, terminating the helix, lock in the groove on the underside of cord 111, when either pin 107, 109 is first directly engaged against one side of appliance cord 111 and the latter is appropriately flexed while the lamp is rotated about an axis perpendicular to the paper to engage the other pin 109, 107 firmly with the opposite side of the cord, both legs 110 snapping into the axially oriented groove on the underside of the appliance cord. A string, tie, or clip 112, through not essential, may optionally be applied to prevent disengagement of lamp from cord in the event that the assembly is to be subjected to sufficient twisting to dislodge the lamp.

The helical lamp seen in FIGS. 16 and 17 is similar in external configuration to the one immediately preceding it. Aside from the fact that its cavity 115 contains a filament and that its piercing pins are each spotwelded to one of the filament supports 117, which lead along the inner periphery, other differences are also significant. Both ends are of solid glass; and the short cavity 115 containing the filament is closed by a cover 119, of strip glass synchronously fed and fused thereupon. The lamp may alternatively be externally etched or coated with a material 120, shown by a dashed outline, having a lower index of refraction, such as is used in the processing of fiber optics, or so treated as to produce a mismatched index at its surface in order to yield a uniform glow (more or less) along its length rather than a single bright spot at its center.

Referring now to FIGS. 18 and 19, there are shown two views of insert lamp 125, which is installed in appliance cord 126 by splitting and separating for a short interval the two insulated leads, slipping the narrow neck 127 of the lamp 125 between them and forcibly impaling the halves inwardly upon the oppositely aimed pins 128 projecting outwardly from neck 127.

These pins 128 are in turn the lower ends of leads supporting filament 129. While this lamp may remain engaged upon the cord, it may be preferable to provide means for engaging the cord with the lamp in place. The means may be a slot 130 on any surface of appliance 131 in FIG. 19 or an ancillary spring clip 132, of metal or plastic, as in FIG. 18.

In FIGS. 20 and 21, there is next seen a second lamp structurally resembling the preceding one. This glow-indicator type has electrodes 135 and 136, each having an internal annular resistor 137 separating their outer layers from piercing pins 138. Engagement of pins 138, which are the lower portions of the respective leads, with split cord 139 will, if carefully made, hold better without a clip than will the prior version. Optional use of clip means is, however, contemplated Referring now to FIG. 22, there is shown a small button-shaped cylindrical lamp 143 having two electrodes communicating between the conductors of cord 140 and energy chamber 141. The electrode construction is similar to that of 79, 80, 81, in FIG. 9. Such electrodes will normally be pretested before assembly into lamps.

Annular groove 150 permits upper sleeve portion 147 of clamp 148, which is preferably of metal but permissibly of plastic, to be roll-crimped or otherwise assembled thereinto. Clamp 148 includes a pair of integral depending legs 149 that interferably engage appliance cord 140. Clamp 148 may be made detachable if rim 152, engaging groove 150, is given an inside diameter large enough to clear the diameter of the upper portion of lamp 143.

Referring now to FIG. 23, glow-discharge lamp 161 comprises a pair of electrodes 162, having leads 163, 164 leading therefrom via pinch base 165. Base 165 is here portrayed eccentric, generally following the contour of the lamp envelope above but having a relatively flat recessed surface 166, along which a portion of lead 164 may be drawn or looped after it leaves the enclosure. One side of doped resistor 167, having lead 168 preattached, is bonded to surface 166, preferably while the lamp or resistor is still semi-fused, to imprison the loop (or tip) of lead 164.

The combination of lamp and resistor is available between leads 163 and 168, while the lamp alone can be included in an external circuit via leads 163 and 164. Either lead 164 or 168 may be cut along plane AB to avoid any possibility of short circuiting between them. For certain applications, particularly where some switching is involved, all three leads will be used. The availability of both simple and series-resistance leads in the lamp simplifies inventory keeping.

Figure 24:
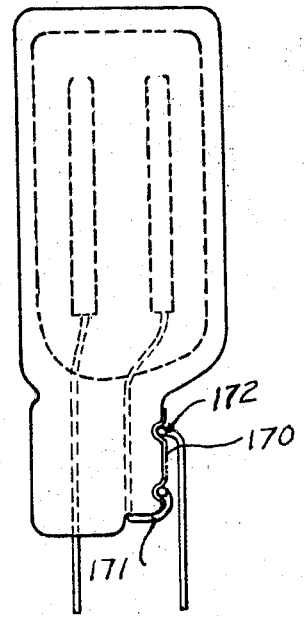

Referring now to FIG. 24, the lamp is similar to that of FIG. 23, except that resistive portion 170 is a thin film or coating of appropriately conductive material, such as tin oxide, which may be deposited before, as shown, or permissibly after the ends of lead portions 171, 172 are impressed into the surface of the base.

Figure 25:
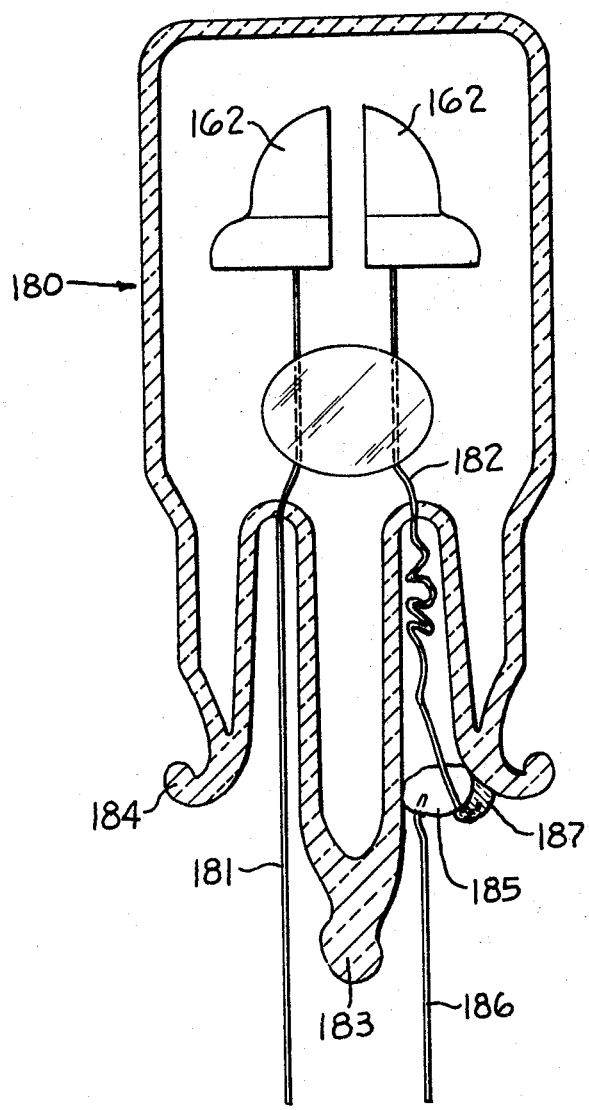

Referring now to FIG. 25, there is seen another glow lamp having leads 181 and 182 emerging from the envelope structure via the annular space between the skirt portion 184 and the sealing tubulation 183. Very tiny resistor 185, having pigtail 186 preattached and depending therefrom, is conductively attached to the terminus of lead portion 182 and is simultaneously bonded, preferably in a recessed zone, in order that it will not project beyond the large diameter of the envelope and thus interfere with a subsequent assembly stage, to a surface of lamp 180 by a deposit of conductive adhesive 187, which is preferably of a fused vitreous nature. Alternatively, of course, lead 182 might have been made continuous beyond adhesive 187, as in FIG. 23.

There has been very little discussion above regarding evacuating, atmosphere injecting, and sealing of the lamps. The industry has been most conscious of such aspects because of its preoccupation with design for minimum-cost glass enclosures, size-for-size, while adding many bulky and costly ancillary parts and apparatus, including various forms of sockets, bases, bezels, lamp holders, terminal boards, panels, etc., for cradling and connecting electrically these standardized globules into the various circuits and apparatus with which they must coact.

It is intended that these lamps be capable of manufacture not only on older kinds of glass molding and fusing machinery but on specially designed automatic types that will seal them in atmospheres appropriate for cavity filling, preferably using radiated and conducted heat and refractory tooling in place of burners where practicable, while interposing shields, sinks, and coolant blast during cooling cycles. Because of a desire to avoid prolixity, I have not encumbered each figure and description with illustrations of details of surface treatments, oxidation and reduction means and agents, tipoffs, hollow lead-lined electrodes, tubulations, and other means for adhering metals and glass, evacuating, injecting atmospheres, and conserving neon supplies. The applicability of these techniques is, of course, not the particular subject matter of the invention, but is to be inferred from the fact that we are dealing with the fabrication of electric lamps having vitreous structures.

Because of their very tiny size and very small consumption of materials, as well as because they bring about economies by eliminating ancillary parts and apparatus, the fabricator of these lamps can, as may be desirable to minimize other aspects of processing cost, afford to consume or "waste" materials, including electrode metal, glass, fuel, and filling gases in multiples of the amounts actually required in the lamps themselves.

In order to avoid prolixity the numbers of drawings and descriptions have been held down to the minimum amount necessary to illustrate essentials of the invention. It will be obvious, however, that the illustrated combinations are very susceptible to modification, rearrangement, and recombination, including combination with other art. The electrodes, lamp shapes, energy-source arrangements, resistors, processing steps, functional performance, etc., taught herein are part of this invention and merit full measure of patent protection. The fact that only two-conductor appliance cords have been illustrated does not negate the applicability of the lamp genera to cords having additional conductors, including ground returns, and elsewhere. To aid in the examination of this application, I have tabulated parent claims and the most applicable figures opposite the numbers of all of the claims in the application, as follows.

| Claim | Parent | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| 1 |   | x | x | x | x | x | x | x | x | x | x | x | x | x | x | x | x | x |   |   |   |   | x |   |   |   |
| 2 | 1 |   |   |   |   |   |   |   |   |   |   |   |   |   |   |   |   |   |   |   |   |   | x |   |   |   |
| 3 | 1 | x | x | x | x | x | x | x | x | x | x | x | x | x | x | x | x | x |   |   |   |   |   |   |   |   |
| 4 | 3 | x | x | x |   |   |   |   | x | x | x | x | x | x | x | x | x |   |   |   |   |   |   |   |   |   |
| 5 | 4 | x | x | x |   |   |   |   | x | x | x | x | x | x | x | x | x |   |   |   |   |   |   |   |   |   |
| 6 | 5 | x | x | x |   |   |   |   | x | x | x | x | x | x | x | x | x |   |   |   |   |   |   |   |   |   |
| 7 | 6 | x | x | x |   |   |   |   | x | x | x | x | x | x | x | x | x |   |   |   |   |   |   |   |   |   |
| 8 | 7 | x | x | x |   |   |   |   | x | x | x | x | x | x | x | x | x |   |   |   |   |   |   |   |   |   |
| 9 | 7 |   |   |   |   |   |   |   | x |   |   |   |   | x | x |   |   |   |   |   |   |   |   |   |   |   |
| 10 | 9 |   |   |   |   |   |   |   | x |   |   |   |   | x | x |   |   |   |   |   |   |   |   |   |   |   |
| 11 | 10 |   |   |   |   |   |   |   | x |   |   |   |   |   |   |   |   |   |   |   |   |   |   |   |   |   |
| 12 | 7 |   |   |   |   |   |   |   |   |   |   | x |   |   |   |   |   |   |   |   |   |   | x |   |   |   |
| 13 | 12 |   |   |   |   |   |   |   |   |   |   | x |   |   |   |   |   |   |   |   |   |   | x |   |   |   |
| 14 | 12 |   |   |   |   |   |   |   |   |   |   |   |   |   |   | x | x | x | x |   |   |   |   |   |   |   |
| 15 | 3 |   |   | x | x | x |   |   |   |   |   |   |   | x | x | x | x | x | x |   |   |   |   |   |   |   |
| 16 | 3 |   |   |   |   |   |   |   |   |   |   |   |   | x | x | x | x |   |   |   |   |   |   |   |   |   |
| 17 | 16 |   |   |   |   |   |   |   |   |   |   |   |   |   |   |   |   |   |   |   |   |   | x | x | x | x |
| 18 |   | x | x | x |   |   |   |   | x | x | x | x | x | x | x | x | x |   |   |   |   |   |   | x | x | x |
| 19 | 18 |   |   |   |   |   |   |   | x |   | x |   |   |   |   |   |   |   |   |   |   |   |   | x | x | x |
| 20 | 19 |   |   |   |   |   |   |   | x |   | x |   |   |   |   |   |   |   |   |   |   |   |   | x | x | x |
| 21 | 18 |   |   |   |   |   |   |   | x |   |   |   |   |   |   |   |   |   |   |   |   |   |   |   |   |   |
| 22 | 18 |   |   |   |   |   |   |   |   |   |   |   |   |   |   |   |   |   |   |   |   |   |   |   | x |   |
| 23 | 18 |   |   |   |   |   |   |   | x |   |   |   |   |   | x | x |   |   |   |   |   |   |   |   |   |   |
| 24 | 18 |   |   |   |   |   |   |   |   | x | x |   |   |   | x | x |   |   |   |   |   |   |   |   |   |   |
| 25 | 18 | x | x | x |   |   |   |   | x |   | x |   |   |   |   |   |   |   |   |   |   |   |   | x | x | x |
| 26 |   |   |   |   |   |   |   |   | x |   |   |   |   |   | x | x | x | x | x |   |   |   |   |   |   |   |
| 27 |   |   |   |   |   |   |   |   |   |   |   |   |   |   |   | x | x | x | x |   |   |   |   |   |   |   |
| 28 | 27 |   |   |   |   |   |   |   |   |   |   |   |   |   |   |   |   |   |   |   |   |   |   |   |   |   |
| 29 |   | x | x | x | x | x | x | x | x | x | x | x | x | x | x | x | x |   |   |   |   |   | x |   |   |   |
| 30 |   |   |   |   |   |   |   |   |   |   |   |   |   |   |   |   |   |   |   |   |   |   | x |   |   |   |
| 31 |   |   |   |   |   |   |   |   |   |   |   |   |   |   |   |   |   |   | x | x | x | x |   |   |   |   |
| 32 | 31 |   |   |   |   |   |   |   |   |   |   |   |   |   |   |   |   |   |   | x | x |   |   |   |   |   |
| 33 | 31 |   |   |   |   |   |   |   |   |   |   |   |   |   |   |   |   |   | x | x |   |   |   |   |   |   |
| 34 | 32 |   |   |   |   |   |   |   |   |   |   |   |   |   |   |   |   |   |   | x | x |   |   |   |   |   |
| 35 | 31 |   |   |   |   |   |   |   |   |   |   |   |   |   |   |   |   |   |   |   |   |   |   |   |   |   |

It is obvious that certain features of one embodiment may be combined variously with others. It is further obvious that the teachings herein may be combined with the old art and that they will stimulate imitation in configurations that may differ in unessential details from the representative types selected for portrayal here, without departing from the scope of these teachings. My invention is not to be limited to the specific forms or arrangements of parts shown, described or specifically covered by claims. It is intended that all of the equivalent approaches to the structure, the objects and the functions deducible from these disclosures by one skilled in all the applicable arts be covered by the claims. Therefore,

I claim:
1. An electric lamp comprising:
   a radiant-energy producing device;
   a fused, hermetically sealed, radiant-energy transmitting, vitreous structure forming an enclosure containing said device;
   a pair of legs depending below said structure on opposite sides thereof to termini of said legs therebelow,
   the space interval between said legs being generally shorter at said termini than immediately thereabove; and
   a plurality of conductive electrical leads for said device, said leads extending from said device through said structure and terminating inwardly of said legs in sharp stiff points.
2. An electric lamp as in claim 1,
   said structure having an integral laterally extending flange,
   an annular member supported upon said flange,
   said legs depending from said annular member,
   said termini being disposed to yieldingly oppose entry from below by an extraneous object of interfering width interposed therebetween,
   said termini also being disposed to return inwardly when such interposition is at least partially relieved.
3. A lamp as in claim 1
   said legs being part of said fused structure.
4. A lamp as in claim 3,
   wherein said device is of the glow-discharge type.
5. A lamp as in claim 4,
   said leads terminating at their upper ends as electrodes for said device in said enclosure.
6. A lamp as in claim 5,
   at least one of said leads having a relatively high resistance included therein.
7. A lamp as in claim 6,
   said at least one lead having at least a portion thereof made of electrically conductive vitreous material.
8. A lamp as in claim 7,
   said portion being a part of said fused structure.
9. A lamp as in claim 7,
   said at least one lead being primarily constructed of vitreous material of low electrical conductivity fused to said structure.
10. A lamp as in claim 9,
   said at least one lead including a sharp vitreous tip.
11. A lamp as in claim 10,
   another of said leads including a sharp vitreous tip.
12. A lamp as in claim 7,
   said portion being contained generally within said enclosure.
13. A lamp as in claim 12,
   said portion being coated with a material of conductivity higher than the conductivity of said portion.
14. A lamp as in claim 12,
   another of said leads having a vitreous portion thereof located within said enclosure.
15. A lamp as in claim 3,
   wherein said device is of the incandescent filament type.
16. A lamp as in claim 3,
   said structure having an elongated curved configuration terminating in said legs.
17. A lamp as in claim 16, said configuration approximating a helix.
18. An electric lamp comprising:
   a radiant energy producing device;
   a fused, hermetically sealed, radiant-energy transmitting, vitreous structure forming an enclosure containing said device,
   said device being of the glow-discharge type; and
   a plurality of conductive electrical leads for said device,
   said leads extending downwardly from said device through said structure and terminating outside said structure,
   at least a portion of said structure being electrically conductive and forming a resistive path for at least one of said leads.
19. A lamp as in claim 18,
   said portion being fused onto the exterior of said structure.

20. A lamp as in claim 19,
said portion being at least partially recessed below the level of a proximate surface of said structure.
21. A lamp as in claim 18,
said portion being intermediate between metallic portions of at least one of said leads.
22. A lamp as in claim 18,
said portion being a surface film.
23. A lamp as in claim 18,
said portion projecting outwardly from within said structure.
24. A lamp as in claim 18,
said portion being contained interiorly in said structure.
25. A lamp as in claim 18,
said portion projecting from said structure into said enclosure.
26. An electric lamp comprising:
a radiant-energy producing device;
a fused, hermetically sealed, radiant-energy transmitting, vitreous structure forming an enclosure containing said device,
said device being of the glow-discharge type; and
a plurality of conductive electrical leads for said device,
said leads extending downwardly from said device through said fused structure and terminating outside said structure,
at least one of said leads including a resistive portion,
said resistive portion being seated and supported entirely upon and bonded exteriorly to said structure in a recess generally below the level of a proximate surface thereof.
27. An electric lamp comprising:
a radiant-energy producing device;
a fused, hermetically sealed, radiant-energy transmitting, vitreous structure forming an enclosure containing said device,
said structure having an elongated configuration in the form of a curve; and
a plurality of conductive electrical leads for said device,
said leads extending from said device through said structure and terminating in sharp points extending inwardly of said curve.
28. A lamp as in claim 27, said curve being generally helical.
29. An electric lamp comprising:
a radiant-energy producing device;
a fused, hermetically sealed, radiant-energy transmitting, vitreous structure forming an enclosure containing said device;
a pair of inwardly turned legs depending below said structure on opposite sides thereof to termini of said legs therebelow; and
a plurality of conductive electrical leads for said device,
said leads extending from said device through said structure and terminating inwardly of said legs in sharp points,
whereby said inwardly turned depending legs are adapted for gripping an electrical appliance cord, while said points pierce the insulation and engage the conductors of said cord to energize said device.
30. An electric lamp comprising:
a radiant-energy producing device;
a fused, hermetically sealed, radiant-energy transmitting, vitreous structure forming an enclosure containing said device,
said structure having an integral laterally extending flange;
an annular member resting upon said flange and having oppositely disposed legs depending therefrom,
said legs terminating in feet having a spaced interval therebetween; and
a plurality of conductive electrical leads for said device,
said leads extending from said device through said structure and terminating between said legs in sharp points,
said feet being disposed to yieldingly oppose an entry from below by an extraneous object of interfering width interposed therebetween,
said feet being also disposed to return inwardly when such interposition has been at least partially relieved.
31. An eletric lamp comprising:
a radiant-energy producing device;
a fused, hermetically sealed, radiant-energy transmitting, vitreous structure forming an enclosure containing said device,
said structure having an intermediate waist portion below said enclosure; and
a plurality of conductive electrical leads for said device,
said leads extending from said device through said structure and projecting outwardly therefrom on opposite sides of said waist portion,
said leads terminating opposite said waist in sharp points.
32. A lamp as in claim 31,
wherein said device is of the glow-discharge type.
33. A lamp as in claim 31,
wherein said device is of the incandescent-filament type.
34. A lamp as in claim 32,
wherein at least one of said leads has a relatively high resistance incorporated therein.
35. A lamp as in claim 31,
having also an auxiliary spring-clip means, including opposed arms and having a generally U-shaped contour,
said arms being disposed to yieldingly oppose entry therebetween from the open end of said clip by an extraneous object of interfering width interposed therebetween,
said arms being also disposed to return inwardly when such interposition is at least partially relieved,
whereby an electrical appliance cord that has been split down the middle between the insulated conductors thereof may be entered by said lamp to the depth of said waist and clamped thereto by said clip.

References Cited

UNITED STATES PATENTS

| | | | |
|---|---|---|---|
| 1,067,024 | 7/1913 | Hall et al. | 315—312 X |
| 2,222,093 | 11/1940 | Swanson | 313—220 X |
| 3,227,909 | 1/1966 | Schilling et al. | 313—220 X |

JAMES W. LAURENCE, *Primary Examiner.*

C. R. CAMPBELL, *Assistant Examiner.*

U.S. Cl. X.R.

313—185, 210, 217, 318, 333